April 10, 1934.    F. FAUSETT    1,954,311
ELECTRIC METER
Filed May 15, 1933

Inventor
Floyd Fausett
By Knight Bros.
His Attorneys

Patented Apr. 10, 1934

1,954,311

UNITED STATES PATENT OFFICE 1,954,311

ELECTRIC METER

Floyd Fausett, Greenwood, Miss., assignor to Supreme Instruments Corporation, Greenwood, Miss.

Application May 15, 1933, Serial No. 671,251

8 Claims. (Cl. 171—95)

This invention relates to a combined alternating current and direct current meter embodying a rectifier with compensating means for the variations in resistance in the rectifier occasioned by changes in temperature.

This invention particularly presents an improvement over the type of meter disclosed and claimed in the United States patent to Johnson, No. 1,811,319, June 23, 1931. In this meter the magnitudes of alternating and direct current energies may be read directly from the same scale. This universal adaptation of the instrument is made possible by a galvanometer coil across the output of a full wave rectifier with a shunt circuit selectively associated therewith to change the value of the current flowing through the coil in a ratio of 1:1.11 in order that both alternating and direct current energies may be read upon the same scale.

It is the object of this invention to associate a temperature compensating arrangement with the meter in order to render the measuring instrument accurate over a wide range of temperature variations.

It is a further object of my invention to adapt the galvanometer movement of the instrument to indicate current and voltage readings over a wide range of values and also resistance measurements covering a great range of ohmic values.

Figure 1:
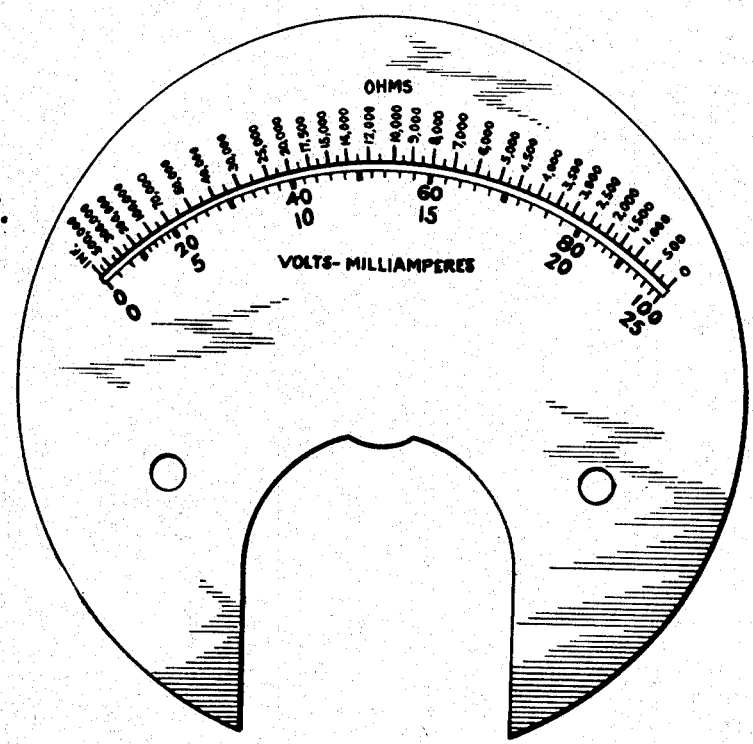
Figure 2:
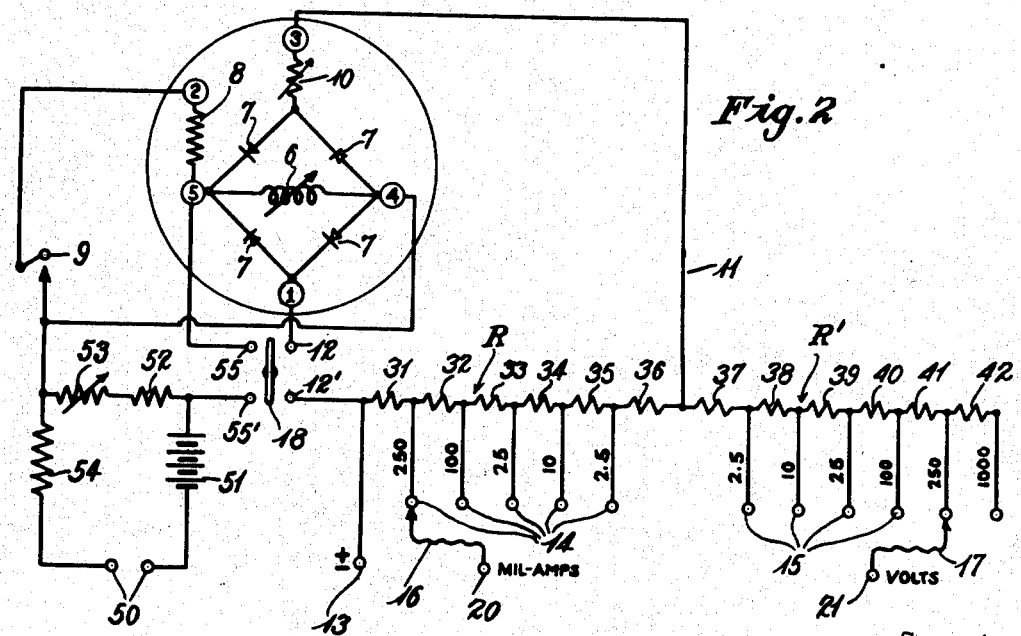

Other objects and purposes will appear from a more detailed description of the invention taken in conjunction with the drawing wherein Fig. 1 is a plan view of the face of the instrument upon which are calibrated numerical scales for the reading of volts, milliamperes and ohms, and Fig. 2 is a circuit diagram of the elements arranged according to the instant invention.

Fig. 1 shows two scales ranging from 0 to 25 and from 0 to 100, for indicating either the values of volts or milliamperes in dependence upon the range of values desired, as described in detail hereinafter. Another scale is furthermore provided to indicate resistance values over a wide range of ohmic values, the instrument being capable of indicating resistances up to 500,000 ohms.

In Fig. 2, the instrument is provided with five terminals which are numbered 1, 2, 3, 4 and 5. The direct current galvanometer movement 6 is connected between terminals 4 and 5. These terminals 4 and 5 constitute the output terminals of a full wave rectifier composed of four individual rectifiers 7 connected in the well known bridge arrangement. These individual rectifiers may be of any desired type, such as copper oxide rectifiers, crystal rectifiers, or any other type well known in the art. A variable resistor 10, formed of an alloy of nickel, copper, and iron, and known as Monel-metal, is connected in series with the rectifier bridge between terminal 3 and one of the input terminals of the bridge. A conductor 11 connects the terminal 3 to one end of a shunt resistance R, formed of a plurality of sections 31 to 36. The other input terminal 1 of the rectifier bridge is connected to the other end of shunt resistance R through the bridging of contacts 12, 12' by means of a movable switch member 18. A series resistance R' consisting of a series of sections 37 to 42 is connected to the end of conductor 11. The several sections of the shunt and series resistances R and R' are tapped to contacts 14 and 15 respectively. A movable switch arm 16 selectively connects one of the taps 14 with a terminal 20 for the reading of milliamperes. A movable switch arm 17 selectively connects one of the contacts 15 with terminal 21 to obtain the reading of volts. The common terminal 13, which is connected to the terminal 1 on the instrument co-operates selectively with both terminals 20 and 21.

Connected in shunt with the galvanometer terminals 4 and 5 is a circuit containing a resistance 8 in series with a switch 9 which may be set in its open or closed position. The resistance of the galvanometer coil movement 6 is 350 ohms, and the coil is designed to execute a full scale deflection at the passage of 360 micro-amperes therethrough. At the reading of alternating current energy, switch 9 is maintained in its open position at which time the instrument reads the average value of the alternating current as the same is rectified by the rectifying elements. In the case that direct current is measured, the conductivity of the rectifier bridge allows the passage of the direct current energy through the galvanometer unit 6 without any effect thereon. It is desired that the instrument indicate the effective values of the energies. In the case of a direct current, the average value and the effective value are the same. However, for alternating current the effective value is 1.11 as great as the average value. This numeral represents the form factor of an alternating current having the form of a true sine wave. For that reason, resistance 8 is chosen with respect to the resistance of the galvanometer unit 6 so that under a constant output from the rectifier or a constant input to the coil 6, the current passing through galvanometer 6 when switch 9 is closed is $\frac{1}{1.11}$ as great as that passing through coil 6 when switch 9 is open. Thus switch 9 is maintained open for the reading of alternating current energy and is kept closed when direct current energy is measured making the same scale adaptable for both forms of energy measurement. Thus when coil 6 has a resistance of 350 ohms, the value of the resistance 8 is 3150 ohms so that the above relationship is established.

In order to overcome variations in resistance of the rectifying bridge caused by changes in temperature, the compensating resistance 10 is provided, which has a temperature coefficient of resistance opposite in sign to that of the rectifier bridge. It has been found that, at an ambient temperature of 25° C., commercial full wave rectifiers, such as are used in assemblies of the type disclosed herein, have a temperature coefficient which averages negative 0.003 with a load of 240 microamperes, which represents a two-thirds scale deflection of the meter in the instant application. This two-thirds scale deflection of the meter is assumed to be the average reading observed in a multi-range meter of this type. Heretofore it has been the practice to provide resistors made of manganin wire because commercial manganin wire has a temperature coefficient of zero, this being a desirable characteristic for practically all commercial wire wound resistors. One of the features of my invention is a departure from this practice by forming resistor 10 from Monel-metal which has a positive temperature coefficient of resistance of 0.002. Thus, in the specific application disclosed herein, in which case the combined resistance of the rectifier bridge and resistance 10 between terminals 1 and 3 is 5,000 ohms, the resistance of the rectifier bridge averages 2,000 ohms and that of the resistor 10, 3,000 ohms. Theoretically, perfect compensation is obtained for these values, since for any range in temperature the change in resistance of the rectifier bridge is counter-balanced by the change in resistance of the resistor 10.

The effect of such a compensation may be appreciated by the assumption of certain operating conditions for the metering arrangement shown in Fig. 2. In this case, at an ambient temperature of 25°, the resistance between terminals 1 and 3 is composed of 2200 ohms for the rectifier bridge and 2800 ohms for the resistor 10. For measurements taken at 0° C., the resistance of the rectifier bridge would increase with the decrease of temperature by the product of 25 times 0.003 times 2200 which is equivalent to 165 ohms. With resistor 10 formed of a wire such as a manganin wire having a zero temperature resistance coefficient, the resultant resistance between meter terminals 1 and 3 would amount to 5165 ohms, which introduces a variation of 3.3% from the resistance existing at normal ambient temperature. On the other hand, with resistor 10 designed in accordance with the invention and formed of Monel metal which has a positive temperature coefficient of 0.002, at 0° the resistance of 2800 ohms is reduced by 25 times 0.002 times 2800 or 140 ohms. The resulting resistance between terminals 1 and 3 is now composed of 2660 ohms and 2365 ohms which total 5025 ohms. The resulting variation of 25 ohms introduces an error of 0.5% which is within the allowable limit of errors for instruments of this type.

Other compensating arrangements for rectifiers and resistors could be designed having the proper resistance values and temperature coefficients of resistance to effect a compensation as described above.

My novel metering arrangement allows the galvanometer unit 6 to be efficiently used as an ohmmeter for measuring resistance values over a wide range of ohmic values. The switch member 18 serves to bridge terminals 55 and 55' for the measurement of resistances applied between terminals 50. A 4½ volt battery 51 in a suitable resistance network is connected across terminals 4 and 5 of the rectifier bridge with the polarity of the battery in opposed relationship with respect to the conductivity of the rectifier bridge. By this mode of connection, the terminals 4 and 5, being directly across the galvanometer coil rather than across terminals 1 and 3, a maximum range of 500,000 ohms is made possible rather than only 100,000, which would be the limit on account of the smaller 0.001 ampere sensitivity of the meter occasioned by introduction of the bridge resistance into the measuring unit. The shunt circuit across terminals 4 and 5 exercises no effect upon the resistance measurements by maintaining switch 9 in its open position. The variable resistance 53 of 5,000 ohms in the network serves to vary the sensitivity of the meter in accordance with the varying potential of the battery 51 and adjusts the meter for zero ohms upon the short-circuiting of contacts 50. The resistance values of 52 and 54 are 1,000 ohms and 10,000 ohms, respectively.

In order to measure lower ranges of ohmic values suitable shunt resistors may be inserted in the network as is well known in the art.

The shunt resistor R which enables the measuring of current values of several ranges amounts to 3333⅓ ohms which makes a combined resistance thereof and the resistance between terminals 1 and 3 equivalent to 2,000 ohms. The sections of resistance R, to obtain the ranges indicated in the drawing, have the following resistance values: 31, 13.33 ohms; 32, 20 ohms; 33, 100 ohms; 34, 200 ohms; 35, 1,000 ohms; 36, 2,000 ohms. Series resistance R', for obtaining the various ranges in voltage values, is apportioned as follows: 37, 500 ohms; 38, 7500 ohms; 40, 75,000 ohms; 41, 150,000 ohms; 42, 750,000 ohms.

Having described my invention,

I claim:—

1. A meter comprising a rectifier, a direct current measuring instrument for measuring the output of said rectifier, means for changing the current flowing in said instrument by a fixed small fractional part thereof under constant input conditions of said meter comprising a shunt circuit around said instrument including a resistance of a value considerably greater than of the resistance of said instrument, means for opening and closing said shunt circuit, and a compensating resistance of a relatively large valve with respect to that of the instrument in series with both said instrument and shunt circuit, said compensating resistance having a temperature coefficient of resistance opposite in sign to that of the rectifier.

2. A meter as set forth in claim 1 in which is provided a shunt resistance in shunt with said rectifier, instrument and shunt circuit, two input terminals for said meter, one of said terminals being connected to one end of said shunt resistance and means for connecting the other of said terminals selectively to spaced points along said shunt resistance.

3. A meter as set forth in claim 1 in which is provided a shunt resistance in shunt with said rectifier, instrument and shunt circuit, a series resistance, a neutral terminal and two alternative terminals for said meter, said neutral terminal being connected to one end of said shunt resistance and one end of said series resistance being connected to the other end of said shunt resistance, means for connecting one of said alternative terminals selectively to spaced points in said shunt resistance and means for connecting the other of said alternative terminals selectively to spaced points in said series resistance.

4. A meter comprising a rectifier, a direct current measuring instrument for measuring the output of said rectifier, a resistance network connected to said instrument and rectifier including an adjustable resistance for selecting a plurality of current ranges for said instrument and means for changing the current flow in said instrument by a small fractional part thereof, under each fixed condition of adjustment of said adjustable resistance and fixed input condition of said meter comprising means to change the resistance of a part of said network by a small fractional part thereof, said resistance network furthermore including a compensating resistance having a temperature coefficient of resistance of opposite sign to that of the rectifier.

5. A meter as set forth in claim 4 in which said network also includes an adjustable resistance for selecting a plurality of voltage ranges for said instrument.

6. A meter comprising a rectifier, a D'Arsonval galvanometer coil for measuring the output of said rectifier, a resistance shunting the output of said rectifier when measuring direct currents, means for selectively cutting out said resistance for measuring alternating currents, said resistance being proportional to the electrical resistance of said galvanometer coil corresponding to the form factor of the alternating current so that effective values of direct current will be indicated by the same amount of deflection as average values of alternating current, and a compensating resistance in series with said rectifier having a temperature coefficient of resistance opposite in sign to that of the rectifier.

7. A meter comprising a rectifier, a D'Arsonval galvanometer coil for measuring the output of said rectifier, a resistance shunting the output of said rectifier when measuring direct currents, means for selectively cutting out said resistance for measuring alternating currents, said resistance being proportional to the electrical resistance of said galvanometer coil corresponding to the form factor of the alternating current so that effective values of direct current will be indicated by the same amount of deflection as average values of alternating current, and a compensating resistance of a relatively large value with respect to that of the coil in series with both said coil and shunt resistance, said compensating resistance having a temperature coefficient of resistance opposite in sign to that of the rectifier.

8. A meter comprising a rectifier having a predetermined resistance and temperature resistance coefficient, a D'Arsonval galvanometer coil for measuring the output of said rectifier, a resistance shunting the output of said rectifier when measuring direct currents, means for selectively cutting out said resistance for measuring alternating currents, said resistance being proportional to the electrical resistance of said galvanometer coil coresponding to the form factor of the alternating current so that effective values of direct current will be indicated by the same amount of deflection as average values of alternating current, and a compensating resistance in series with said rectifier having a temperature coefficient of resistance opposite in sign to that of the rectifier, and so dimensioned that over a range of varying temperatures the numerical product of the resistance of the rectifier and its temperature resistance coefficient is at least approximately balanced by the product of the resistance of the compensating resistance and its temperature resistance coefficient.

FLOYD FAUSETT.